United States Patent [19]
Mavridis et al.

[11] Patent Number: 5,486,333
[45] Date of Patent: Jan. 23, 1996

[54] BLOW MOLDING EXTRUSION DIE WITH RECTANGULAR SLOTS

[75] Inventors: Harilos Mavridis, Blue Ash; Ramesh N. Shroff, Cincinnati, both of Ohio

[73] Assignee: Quantum Chemical Corporation, Cincinnati, Ohio

[21] Appl. No.: 122,248

[22] Filed: Sep. 16, 1993

[51] Int. Cl.$^6$ ............................ B29C 47/20; B29C 49/04
[52] U.S. Cl. ........................ 264/541; 264/167; 264/117.1; 264/177.16; 264/209.8; 425/381; 425/465; 425/466; 425/532
[58] Field of Search ................................. 425/532, 380, 425/465, 466, 467, 381; 264/541, 167, 177.1, 177.16, 209.8

[56] References Cited

U.S. PATENT DOCUMENTS

| | | |
|---|---|---|
| 3,309,443 | 3/1967 | Scott, Jr. et al. . |
| 3,981,672 | 9/1976 | Wilson .................................. 425/467 |
| 4,069,001 | 1/1978 | Carrow ................................. 425/467 |
| 4,124,351 | 11/1978 | Garbuio . |
| 4,304,826 | 12/1981 | Kendall et al. ........................ 264/541 |
| 4,394,116 | 7/1983 | Kuenzig et al. . |
| 4,496,301 | 1/1985 | Mozer et al. . |
| 4,650,629 | 3/1987 | Mozer et al. . |
| 4,735,834 | 4/1988 | Mozer et al. . |
| 4,869,862 | 9/1989 | Bryan ................................... 264/541 |
| 5,057,267 | 10/1991 | Seizert et al. . |
| 5,102,588 | 4/1992 | Feuerherm ........................... 264/541 |

OTHER PUBLICATIONS

"Blow Molding Handbook" Technology, Performance, Markets, Economics; The Complete Blow Molding Operation (Dec. 8, 1989); Hanser Publishers; N.Y. (pp. 227–229; 231).

Primary Examiner—Jay H. Woo
Assistant Examiner—Joseph Leyson
Attorney, Agent, or Firm—Gerald A. Baracka; William A. Heidrich

[57] ABSTRACT

A die for a blow molding machine has at least one circumferential rectangular cutout section contiguous with the die exit in at least the die ring or the mandrel. The rectangular cutout section expands the material flow channel between the die ring and the mandrel to increase the volume flow of material passing through the die exit at the rectangular cutout section. However, the constant length of the rectangular cutout section in a longitudinal direction maintains a constant linear velocity of material flowing through the die exit.

9 Claims, 4 Drawing Sheets

BLOW MOLDING EXTRUSION DIE WITH RECTANGULAR SLOTS

BACKGROUND OF THE INVENTION

1. Field of the Invention

The present invention relates generally to the area of shaping a parison in a blow molding process, and more particularly, to a die for extruding a tubular parison having a nonuniform circumferential wall thickness.

2. Description of the Related Art

Polyolefins, such as polyethylene, polypropylene and copolymers of ethylene and propylene are commonly used in blow molding processes to produce containers such as bottles. In a typical blow molding process, a tubular parison, or container preform, is produced by extruding a thermoplastic material vertically downwardly through a circular die having a generally cylindrical flow channel which diverges or converges in diameter over a short flow channel segment terminating at the die outlet. Therefore, that short flow channel segment is a frustoconical channel bounding a volume shaped like either a frustum or an inverted frustum. The circular die includes a die ring and a mating mandrel located within the die ring. Typically, the mandrel is mounted so that it moves longitudinally with respect to the die ring under manual or automatic control. Relative motion between the die ring and mandrel varies the die gap at the die outlet to control the wall thickness of the tubular parison. The vertical, molten, tubular parison drops between two halves of an open mold, and the mold closes squeezing the top and bottom ends of the parison together. That squeezing action changes the generally circular cross-section and shape of the tubular parison to a generally elliptical cross-section and shape. A gas, such as air, is injected through one end of the mold into the interior of the parison and pushes the molten tubular parison against the internal surfaces of the mold. After a cooling period, the mold is opened, and the blow molded article, such as a container or bottle, is ejected therefrom.

When the molten parison changes from a generally circular to a generally elliptical shape, the spatial relationship between the parison's tubular side walls and the internal surfaces of the mold changes significantly. Consequently, in those situations where the shape of the desired container does not correspond to the elliptical shape of the parison, during the blowing process, the tubular side walls of the elliptical parison are stretched over different lengths. Further, the thickness of the parison wall is inversely proportional to the length over which it is stretched. Therefore, a parison with an elliptical cross-section will produce a container having a varying cross-sectional wall thickness profile, that is, the wall thickness of the container as measured around a cross-sectional perimeter will vary. Nonuniformity of wall thickness produced by changes in the spatial relationship between the parison and the internal mold surfaces is a problem in manufacturing a container of any shape. However, it is often more of a problem when producing noncircular containers having triangular, rectangular or other multilateral shapes. Such shapes often have greater variations in the distances between the elliptical parison and the internal surfaces of the mold.

In blow molding multilateral bottles, such as, square bottles, the mold is typically constructed to have the mold parting line bisect the mold diagonally across a first pair of mold corners. Therefore, when the mold is closed squeezing the parison into an elliptical shape, the major axis of the elliptical shape of the parison aligns with the mold parting line. The parison side walls at the ends of the major axis of the ellipse are closer to the first pair of mold corners along the mold parting line than they would be if the parison were circular. The second pair of mold corners, perpendicular to the mold parting line, are coincident with the minor axis of the elliptical parison. The parison side walls at the ends of the minor axis of the elliptical parison shape are further from the second pair of mold corners than they would be if the parison were circular. Consequently, when using a standard circular extrusion die to produce a molten tubular parison having a constant wall thickness, the wall thickness of the blown bottle in the second pair of corners perpendicular to the parting line stretches more within the mold and has less material than the other peripheral wall sections including the first pair of corners. Therefore, the strength of the bottle, as measured by its resistance to column crush, that is, resistance to crush from a force applied along its longitudinal axis, is significantly reduced.

To overcome the above disadvantage of producing a multilateral bottle with a nonuniform wall thickness, it is known to use parison extrusion dies having circumferential ovalization grooves or segments located opposite the mold corners perpendicular to the mold parting line to increase the die gap across those segments. For example, as shown in U.S. Pat. No. 3,309,443, issued on Mar. 14, 1967 to J. Scott et al., the ovalization segments produce a parison having a nonuniform wall thickness in which the parison wall is thicker at the locations corresponding to the bottle corners perpendicular to the mold parting line. A typical ovalization segment produces an expanded die gap opening with a circumferential width in a range of from 60 degrees to 90 degrees. The depth of the ovalization segment is the radial expansion of the die gap and is measured from the nonovalized die wall. The depth of ovalization is in a range of from 0.001 inches (0.025 mm) to 0.010 inches (0.25 mm). The depth varies from zero at the ends of the circumferential width of the ovalization segment to its full depth value at the midpoint of the circumferential width of the ovalization segment. The ovalization length extends up the frustoconical segment, or land, of the die ring or mandrel in a circular arc. The ends of the arc coincide with the ends of the width of the ovalization segment; and the maximum length, which is the maximum radial length of the arc, occurs at the midpoint of the circumferential width of the ovalization segment. Typically, the ovalization length is defined as a percentage of the maximum radial length of the ovalization arc to the total length of the frustoconical segment in the die.

The ovalization segment at the die outlet increases the die gap within the ovalization segment and in turn, increases the mass flowrate or volume flowrate of material through the ovalization segment at the die outlet, thereby providing a thicker parison wall downstream of the ovalization segment. The thicker parison wall provides more material to flow into those areas of the mold where the parison is stretched over a greater length. However, a problem with the above downstream ovalization segments is that the linear velocity of the material at different points across the circumferential width of the ovalization segment is nonuniform and varies substantially from the linear velocity of the material in the nonovalized areas of the die gap. The linear velocity of the material at the midpoint of the ovalization segment may be 50% more than the linear velocity in the nonovalized sections of the die gap. Therefore, material downstream of the ovalization segment is flowing faster than adjacent material downstream of the nonovalized die gap areas. Significant linear velocity variations at different circumferential points of the parison wall are manifested by the material in the thicker heavier parison wall sections flowing over itself, that is, rippling, as it flows down the length of the parison.

That velocity difference plus gravitational forces also cause the thicker and heavier portions of the parison walls to move inwardly and the thinner wall sections of the parison to move outwardly thereby creating a parison having a generally elliptical cross-section. That generally elliptical shape is produced before the parison is clamped by the mold. The tendency for the thicker molten wall section to come together increases as the parison length increases. In the most extreme case, the parison deformation can quickly reach the point where the thicker heavier wall sections contact each other within the length of the mold, at which point, the parison is defined as collapsing. The collapsed parison cannot be blown; and consequently, the process must be stopped; the collapsed parison removed from the machine and the machine restarted. Even if the parison does not collapse, these variations in parison wall thickness can produce folds in the parison which result in undesirable defects in the bottom of the blown bottle.

To overcome problems caused by nonuniform velocities in a blow molding extrusion die with ovalization segments, U.S. Pat. No. 4,496,301 issued on Jan. 29, 1985 to L. Mozer et al., provides a set of second depressions at the upstream end of the frustoconical segment of the die which are equally spaced between the ovalization segments. The second, upstream depressions increase the velocity of the material flowing in the circular areas of the die between the downstream ovalization segments and attempt to reduce the velocity differentials created by the ovalization segments. By reducing velocity differentials, the rippling effect and the probability of parison collapse is reduced.

The above die designs change volume flow around the circumference of the parison to provide a material distribution that results in uniform wall thickness of a blown bottle. In all cases of prior die designs, changes in circumferential material volume flow have the disadvantage of producing variations in the linear velocity of the material at different circumferential points.

SUMMARY OF THE INVENTION

To overcome the disadvantages associated with the downstream arcuate circumferential ovalization segments and the secondary upstream velocity compensation depressions, the present invention provides a die having a material flow channel with downstream rectangular slots, that is, circumferential generally rectangular cutouts in either the die ring or the mandrel, at the die outlet. The rectangular slots provide circumferential variations in the extruded material mass flowrate, but the material is extruded at an approximately constant linear velocity through the die exit. The invention is particularly useful for producing parisons having a circumferentially nonuniform wall thickness and is especially well suited for use in blow molding multilateral containers or bottles.

According to the principles of the present invention and in accordance with the described embodiments, the die has an annular material flow channel between the die ring and the mandrel which diverges or converges and terminates at the circumferential die exit, or die outlet. The annular material flow channel includes a section of increased flow channel depth created by a circumferential generally rectangular cutout section in either the die ring or the mandrel adjacent the die exit. Therefore, the flow channel depth and die gap are increased over the circumferential width of the rectangular cutout section.

The circumferential generally rectangular cutout section in the die ring or mandrel expanding the flow channel will, for purposes of this disclosure, also be referred to as a "rectangular slot". The rectangular slot is preferably cutout of the frustoconical land surface of the die ring and is contiguous with the die exit. The rectangular slot has a circumferential generally rectangular cutout surface overlapping and angularly offset into the die ring land surface. The rectangular slot has an approximately constant length measured across the rectangular surface along a line perpendicular to the die exit. The rectangular slot has a width extending circumferentially around the material flow channel. The depth of the rectangular slot measured radially at the die exit varies from a minimum value at the ends of the width of the rectangular slot to a maximum depth value at the midpoint of the rectangular slot width. Further, in a longitudinal direction relative to the die, the radial depth of the rectangular slot varies from a maximum value at the die exit to a minimum value at the upstream end of the rectangular slot where the rectangular surface intersects the die ring land surface. The die has a number of circumferential rectangular slots corresponding to the number of areas in the mold where additional material is required.

The invention further comprises a method of extruding a tubular parison having a nonuniform circumferential wall thickness by feeding the material through a die having a circumferential generally rectangular cutout section in either the die ring or the mandrel so that the thermoplastic material exits the die with circumferentially varying mass, or volume, flowrate but an approximately constant linear velocity at all circumferential points around the die exit.

The circumferential rectangular slot increases the mass or volume flow and flowrate of material through the rectangular slot portion of the die outlet, thereby providing a thicker parison wall downstream of the rectangular slot. The thicker parison wall provides more material flow and more uniform bottle wall thickness in those parts of the blown container where the parison is stretched over a greater length. However, because the length of the rectangular slot is constant versus the arcuate shape of the length of the prior art ovalization segment, when the dimensions of the rectangular slot are optimized, the linear velocity of the material across the width of the rectangular slot is approximately equal to the linear velocity of the material outside the width of the rectangular slot. Such an equalization of linear velocities around the circumference of the die exit is not possible with the prior arcuate ovalization segments. Further, even when the dimensions of the rectangular slot are less than optimal, the difference between the linear velocities within the rectangular slot and outside the rectangular slot will be less than the differences in the linear velocities within and outside the prior art arcuate ovalization segment. Therefore, the invention has the advantage that problems, such as rippling and collapse or folding of the parison, associated with nonuniform circumferential linear velocities of the extruded material are minimized.

These and other objects and advantages of the present invention will become more readily apparent during the following detailed description in conjunction with the drawings herein.

DETAILED DESCRIPTION OF THE INVENTION

Figure 1:
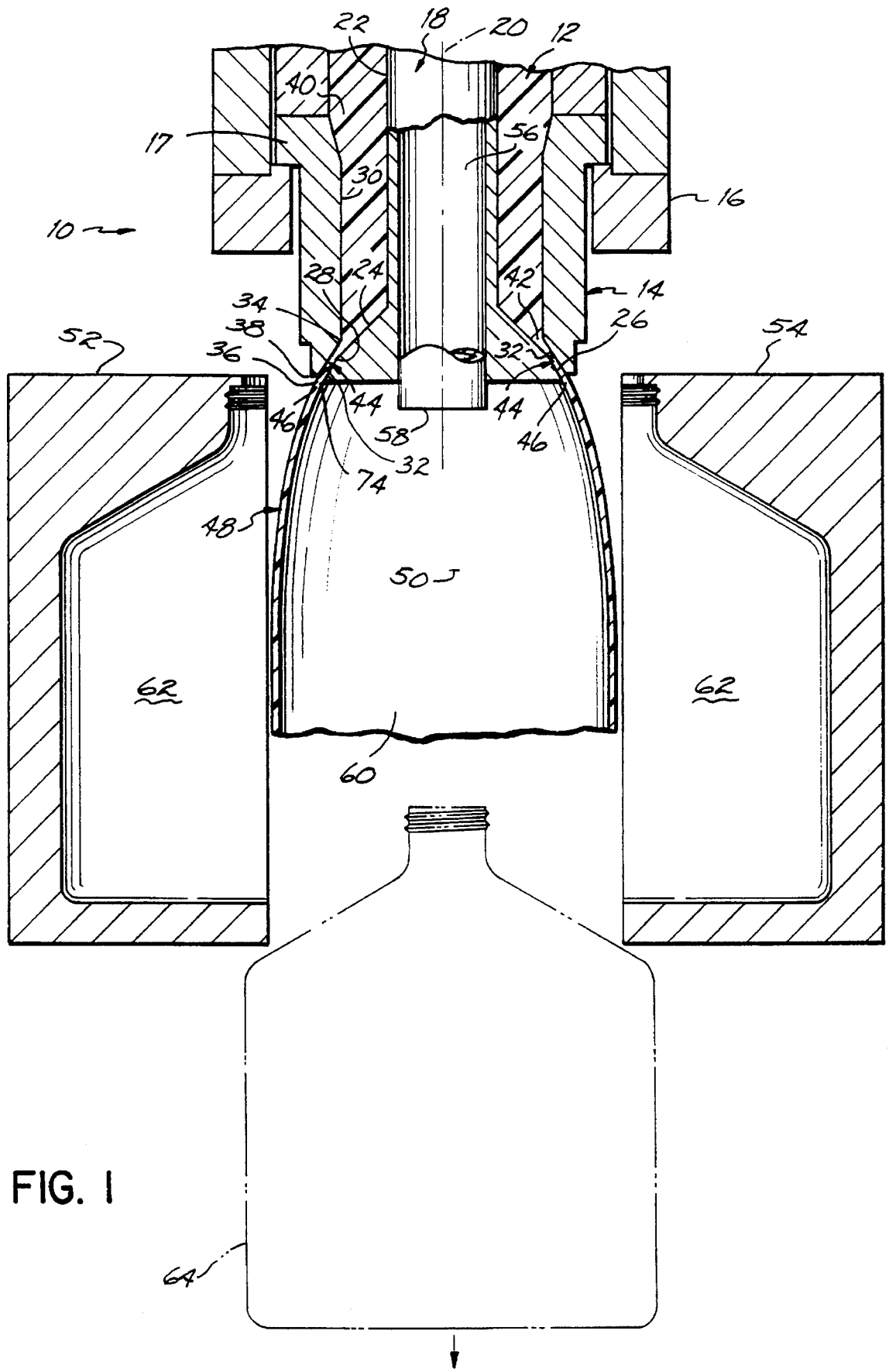
FIG. 1 is a partial centerline cross-sectional view of a die head assembly including a die ring and mandrel and further illustrating the extrusion of a parison between mold halves.

Referring to FIG. 1, the illustrated die head assembly 10 is typical of those used in an extrusion blow molding process. An extrusion blow molding machine has an extruder which provides a molten thermoplastic material 12 to the die head assembly 10 which is generally vertically oriented to extrude a parison in a vertically downward direction. A die ring 14 is mounted in the die head assembly 10 with a clamping ring 16 which supports a mounting flange 17 on the die ring 14. The clamping ring 16 is connected to the die assembly with fasteners (not shown). A mandrel 18 is concentrically located with respect to a centrally located longitudinal centerline, or longitudinal axis, 20 within the die head assembly 10 and is adapted for sliding motion in a direction parallel to the longitudinal centerline 20.

The mandrel 18 typically has a shaft-like body 22 which is connected at one end (not shown) to an adjusting mechanism on the die head assembly 10 which changes the position of the mandrel 18 in a direction parallel to the longitudinal centerline 20. The other end of the mandrel body 22 is typically shaped to form a frustum. The mandrel 18 includes a first frustoconical external surface 24 and a second frustoconical external surface 26 which intersects the first frustoconical surface 24 along a first intersection line 28. The number of frustoconical surfaces and the angles of the frustoconical surfaces with regard to the longitudinal centerline 20 are independent of the considerations of the present invention and are determined by the blow molding application. The die ring 14 has a cylindrical internal surface 30 concentrically located with respect to the longitudinal centerline 20. At one end of the die ring 14, the cylindrical surface 30 intersects a frustoconical internal surface, or die ring land surface, 32 at a second intersection line 34. The land surface 32 flares outwardly from the second intersection line 34 to the outlet end of the die ring 14 at a circumferential die exit 36 on the lower end of the die lip 38.

Molten thermoplastic material 12 in the die head assembly flows vertically downward through a material passage 40 formed between the cylindrical surface 30 of the die ring 14 and the body 22 of the mandrel 18. At the intersection line 34 between the cylindrical surface 30 and frustoconical surface 32 of the die ring 14, the thermoplastic material enters an inlet end 42 of a material flow channel 44 formed between the land surface 32 of the die ring 14 and the external surface 26 of the mandrel 18. Typically, the material flow channel 44 has an annular cross-section which has different diameters at each point along the longitudinal axis 20. The molten thermoplastic material 12 exits the die head assembly 10 at die exit 36 which defines the outlet end 46 of the material flow channel 44 of the die ring 14.

Forcing the molten material under pressure through the outlet end 46 of the material flow channel 44 at the die exit 36 extrudes a generally cylindrical tubular parison 48 with side wall 50 and a longitudinal axis substantially coincident with the longitudinal axis 20. The parison 48 is dropped between open mold halves 52, 54 which are mounted in a clamping mechanism (not shown). When the parison 48 drops past the bottom of the mold halves 52, 54, the mold halves close which pinches the parison at its top and bottom ends. Pinching the ends of the parison 48 changes its generally circular shape to a generally elliptical shape. The exact size and shape of the elliptical cross-section is different at different points along the longitudinal centerline of the parison. The mandrel 18 contains a centerbore 56 through which a blow pin 58 is inserted. The blow pin 58 extends through the mandrel 18 and into the interior cavity 60 inside the parison 48 between the mold halves 52, 54. A gas, such as air, is supplied under pressure through the blow pin 58 and into the interior cavity 60 which is effective to push the molten tubular parison 48 against the internal surfaces 62 of the mold halves 52, 54. After a cooling period, the mold halves open, and a blow molded container 64, shown in phantom, is ejected.

Figure 2:
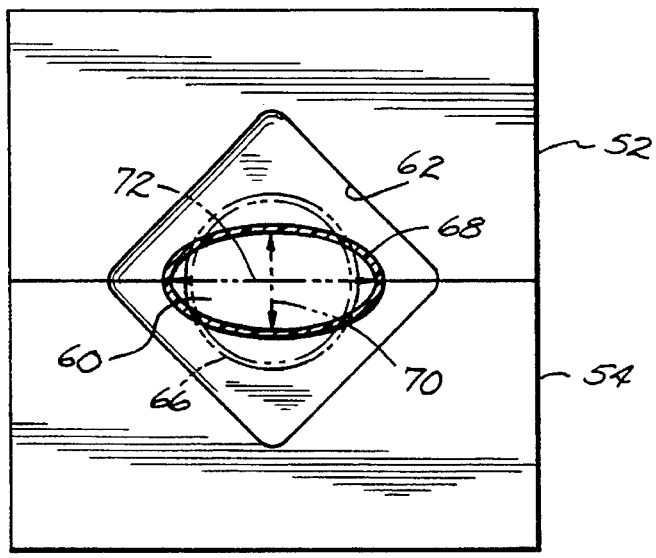
FIG. 2 is a cross-sectional view of a closed mold illustrating the circular and elliptical cross-sections of a parison before and after, respectively, the mold is closed.

Referring to FIG. 2, when the molten parison 48 changes from a generally circular cross-section 66, shown in phantom, to a generally elliptical cross-section 68, the spatial relationship between the elliptical parison's tubular side wall 50 and the internal surfaces 62 of the mold halves 52, 54 changes significantly. Consequently, during the blowing process the tubular sidewalls of the elliptical parison are stretched over different lengths to reach the desired surfaces within the mold cavity. Further, at any circumferential point, the thicknesses of the wall of the blown container is inversely proportional to the length over which the wall has been stretched. Therefore, a parison with an elliptical cross-section produces a container with walls of varying thicknesses. For example, the side walls of the parison at the ends of the minor axis 70 of the elliptical cross-section will be stretched further in order to contact the internal surfaces of the mold and will generally have thinner final wall thicknesses than the container walls that are stretched from the ends of the major axis 72 of the elliptical cross-section. This nonuniformity of container wall thickness is undesirable and is the problem addressed by the present invention.

Given the above knowledge with respect to the geometry of the parison and the geometry of the desired container, the physical characteristics of the parison can be modified to produce a container having the desired uniform wall thickness. The wall thickness of the parison is determined by controlling the size of the die gap 74. The die gap 74 is defined by the size of the outlet end 46 of the material flow channel 44 and is measured by the radial distance separating the die land 32 of the die ring 14 from the second external surface 26 of the mandrel 18 at the die exit 36. The die gap 74 is varied by moving the mandrel 18 longitudinally with respect to the die ring 14. For example, if the container has different widths at different points along its longitudinal axis, as the parison is extruded, the mandrel is moved relative to the die ring to vary the die gap. Consequently, thicker and thinner parison wall sections are successively extruded which longitudinally correspond, respectively, to larger and smaller widths of the container being produced.

The above relative motion between the mandrel and the die ring produces changes in parison wall thickness which are substantially equal at all points around the parison perimeter, that is, at all points along the perimeter of a cross-section taken perpendicular to the longitudinal centerline 20. To compensate for the generally elliptical cross sectional shape of the parison, it is necessary to change the tubular parison wall thickness at different points around the periphery, or circumference, of the elliptical parison.

Figure 5:
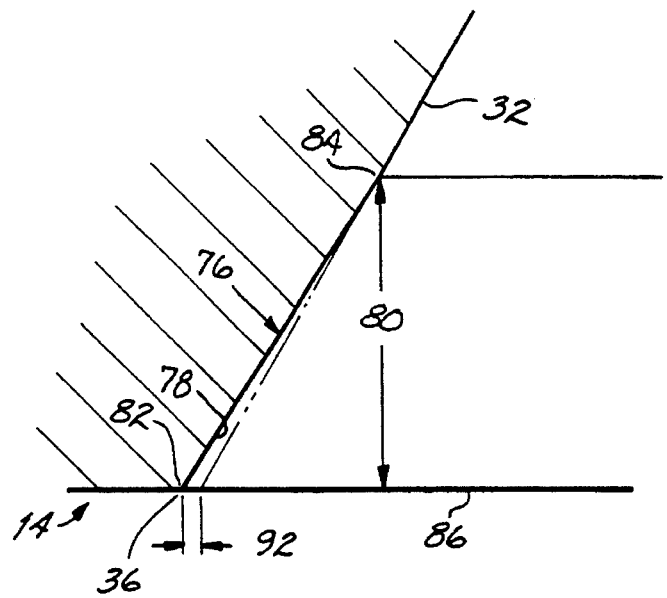
FIG. 5 is an enlarged cross-sectional view taken along lines 5—5 of FIG. 4 and illustrating the depth profile of the rectangular cutout slot section of the present invention.
Figure 6:
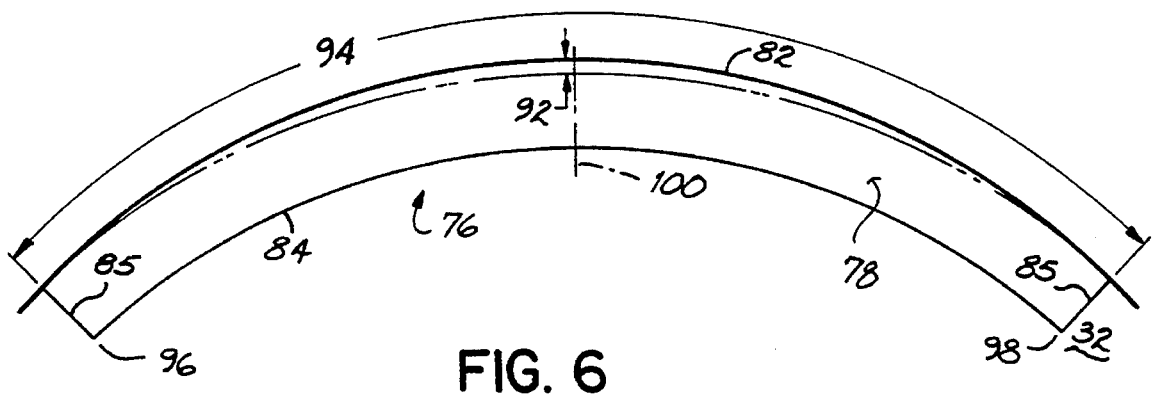
FIG. 6 is an enlarged view of a circumferential section of the die ring illustrating the width profile of the rectangular cutout slot section of the present invention.
Figure 3:
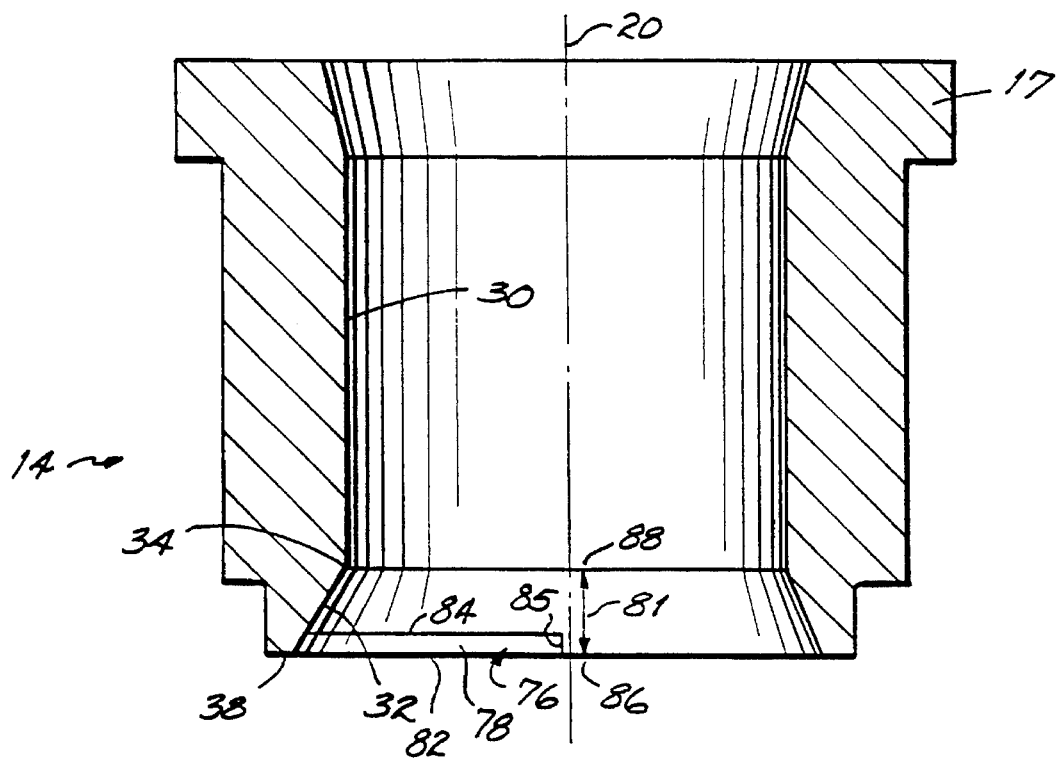
FIG. 3 is a centerline cross-sectional view of the die ring having a rectangular cutout slot section of the present invention.
Figure 4:
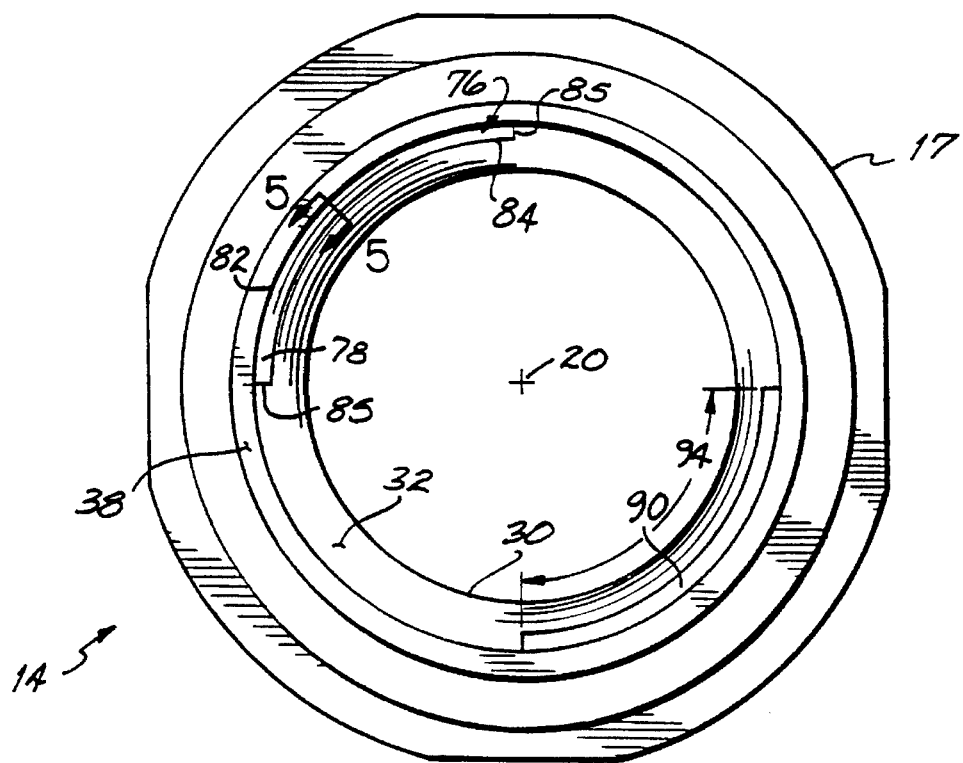
FIG. 4 is a bottom view of the die ring illustrated in FIG. 3.
Figure 7:
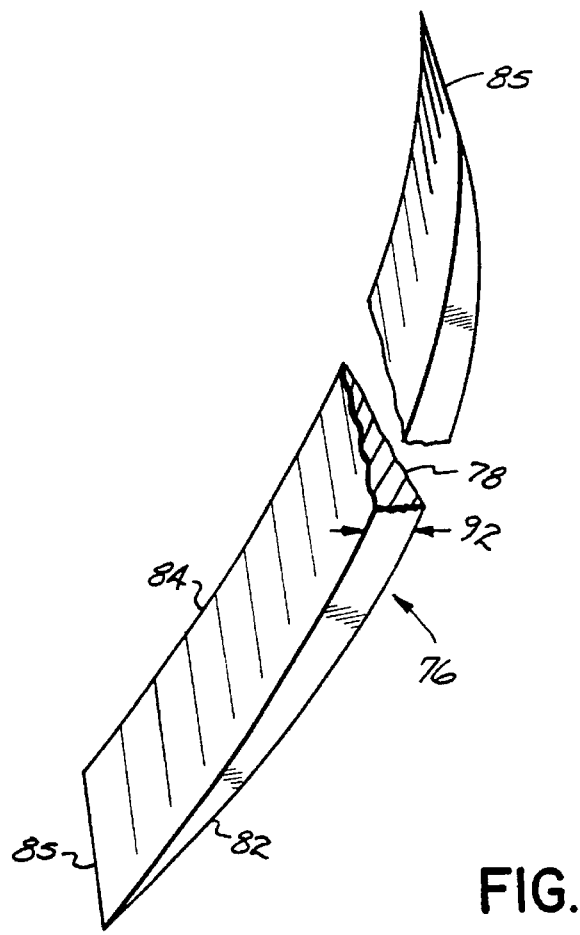
FIG. 7 is a partial perspective view Illustrating the geometric shape of the volume of the rectangular cutout slot section of the present invention.

As illustrated in FIGS. 3–7, the present invention provides a circumferential generally rectangular cutout or slot 76 located at the die exit 36 either on the die ring 14 or mandrel 18. Preferably as shown in FIGS. 4 and 7, the rectangular slot 76 is formed by a fixed, curved, quadrilateral and preferably rectangular cutout surface 78 cut into the frustoconical surface, or die ring land surface, 32 of the die ring 14. Therefore, the rectangular slot surface 78 overlaps and is offset into the die land 32. The surface 78 has a curved, lower, first edge 82 immediately adjacent the die exit 36. The surface 78 has a curved, upper, second edge 84 on the die ring land surface 32 that defines the intersection of the upstream end of the slot 76 with the land surface 32. The upper edge 84 is generally parallel to the curved lower edge 82. The surface 78 further has sides 85 located on the land surface 32 which connect commonly oriented ends of the lower and upper edges, 82, 84, respectively; and the sides 85 are substantially perpendicular to the lower and upper edges, 82, 84, respectively. Referring to FIG. 5, the length 80 of the rectangular slot cutout 76 is constant and is proportional to the length of the sides 85. The length 80 is measured from the lower first edge 82 contiguous with the die exit 36 along a line parallel to the longitudinal axis 20 to the upper second edge 84. The length 81 (FIG. 3) of the die ring land is measured from one edge 86 contiguous with the die exit 36 along a line parallel to the longitudinal axis 20 to an upper opposite edge 88 at the intersection line 34 (FIG. 1). Typically, the length 80 of the rectangular slot 76 is expressed as a percentage of the length of the die ring land 81. For example, a rectangular slot length of 50% is equal to one-half the length 81 of the die ring land 32. The constant length 80 of the rectangular slot 76 has a general range of values of approximately from 10% to 35% of the length of the die ring land 81. Further, the length 80 of rectangular slot 76 has a typical range of values of from 15% to 25% of the length of the die ring land surface 32; and the length 80 of the rectangular slot 76 has a preferred value of 20% of the length of the land surface 32 when blow molding polyolefins.

FIG. 4 illustrates the rectangular slot 76 with a width of 90 degrees relative to the 360 degrees of circumference of the die exit. The number of rectangular slots cutout of the die ring, their widths and location are determined by the application. When blow molding multilateral containers, typically, the number of rectangular slots is equal to the number of corners of the multilateral container that are located off of or away from the mold parting line. For example, for the mold illustrated in FIG. 2, there are two corners of the container which are located off of the mold parting line, therefore, the die ring 14 would have two rectangular slots 76 and 90 which would have a width extending circumferentially around the die exit approximately 90 degrees.

Referring to FIG. 5, the depth 92 of the rectangular slot cutout 76 is measured radially from the die land surface 32 at the die exit shown in phantom to the intersection of the die exit 36 with the rectangular cutout surface 78 created by cutting the rectangular slot into the die ring. The depth 92 of the rectangular slot cutout is zero at the upper edge 84 which is the intersection line between the rectangular cutout surface 78 and die ring land surface 32. Moving longitudinally down the die ring 14 from the upper edge 84 toward the die exit 36, the depth 92 increases uniformly and proportionally to a maximum value at the edge 82 which is contiguous with die exit 36. The depth 92 of the rectangular slot cutout 76 varies in a general range of from approximately 0.001 inches (0.025 mm) to approximately 0.010 inches (0.25 mm). A more typical range of depth 92 varies from approximately 0.003 inches (0.076 mm) to approximately 0.005 inches (0.127 mm). The depth has a preferred value of 0.004 inches (0.100 mm). The rectangular cutout surface 78 is angularly offset into the die ring land surface 32 with respect to the longitudinal centerline 20. For example, the depth 92 between the frustoconical die ring land surface 32 and the frustoconical rectangular cutout surface 78 is generated by increasing the angle of the frustoconical rectangular cutout surface 78 with respect to centerline 20 by approximately two degrees over the angle of the frustoconical die ring surface 32.

Referring to FIG. 6 the depth 92 of the rectangular slot cutout 76 varies circumferentially along the width 94 of the rectangular slot cutout 76 between the sides 85 of the surface 78. The depth 92 is zero at the sides 85, that is, the intersection of the ends 96, 98 of the width 94 with the die ring land surface 32. The depth 92 increases uniformly and proportionally to a maximum value at the midpoint 100 of the width 94. FIG. 7 illustrates a solid representing the shape of the volume of material removed from the circumference of the die ring to create the rectangular slot cutout 76.

In use, the rectangular slot cutout section 76 in the die ring 14 effectively increases the die gap 74 by the depth of the rectangular slot thereby expanding the material flow channel 44 between the die ring 14 and mandrel 18 at the die exit 36. The increased die gap 74 permits a greater volume of material to flow through the die gap over the circumferential width of the rectangular slot cutout 76. However, because the length of the rectangular slot 76 is constant, the material flows through the rectangular slot at an approximately constant velocity at every point around the width of the slot. The configuration of the rectangular slot along the width provides for a maximum volume of material flow at the mid-point 100 of the width 94 and the material flow volume decreases as the width moves towards the ends 96, 98. Consequently, the extruded parison 48 will have an increase in wall thickness that varies as a function of the variation in the depth 92 of the rectangular slot 76. Those thicker wall sections of the parison can be stretched further while maintaining the desired or the same wall thickness as other wall sections of the blow molded container.

The exact dimensions of the depth, length and width of the rectangular slot cutout are determined from a combination of analytical and experimental processes. For example, the deficiencies of a circular die are determined by measuring the wall thickness of a cross-section of a blown container at different points. A wall thickness profile is established from those measurements, and that information is used with a material flow analysis to determine an initial set of depth, length and width parameters of a rectangular slot, A die is manufactured to those specifications which produces a tubular parison having a different wall thickness at different points around a perimeter of an annular cross-section of the parison. Containers produced therefrom are tested and similarly analyzed to determine a new wall thickness profile. If there continues to be undesirable wall thickness variations, the length, width or depth of the rectangular slot are adjusted to provide the flow characteristics that provide the desired container wall thickness.

Figure 8:
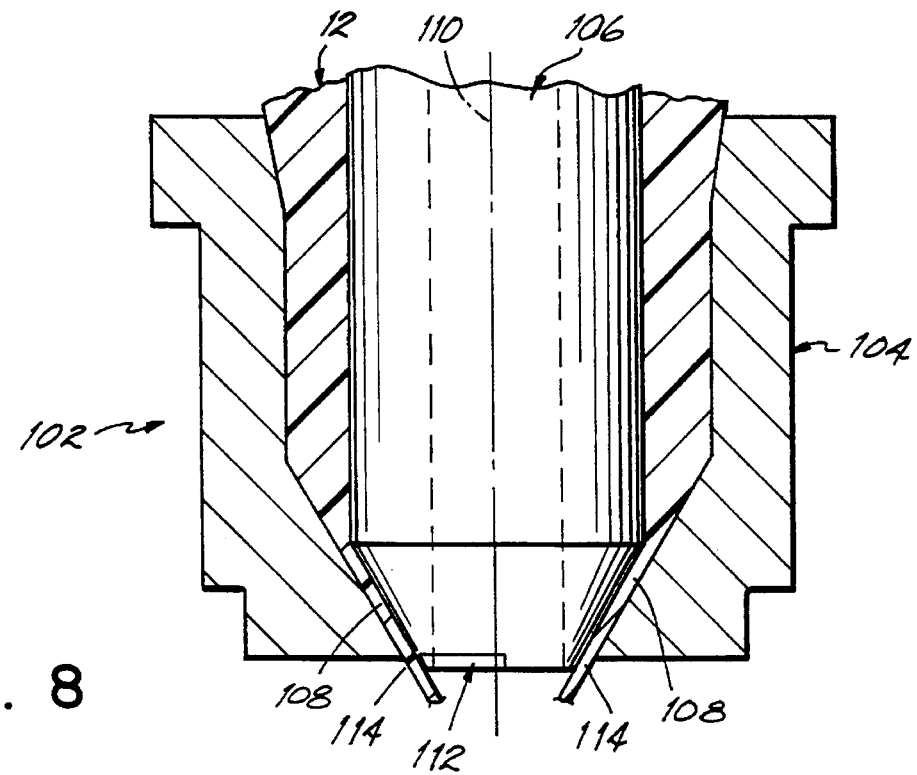
FIG. 8 is a centerline cross-sectional view of an alternative embodiment of a die having a rectangular cut out section in the mandrel.

While the invention has been set forth by the description of the embodiments in considerable detail, it is not intended to restrict or in any way limit the claims to such detail. Additional advantages and modifications will readily appear to those who are skilled in the art. For example, referring to FIG. 8, a die 102 has a die ring 104 and mandrel 106 forming a material flow channel 108 there between which tapers inwardly toward the die centerline 110. A circumferential rectangular section 112 is cut out from the circumference of the mandrel 106 at the die exit 114. Consequently, the rectangular cutout section is equally effective whether cut out of the die ring 104 as described earlier or cut out of the mandrel 106. The rectangular slot of the present invention is applicable to dies which have a material flow channel which flares outwardly in a frustoconical shape or tapers inwardly in an inverted frustoconical shape or is cylindrical. The number of rectangular slots cut out of the circumference of the die exit are a function of the product being molded and the construction of the molds. In addition, the exact dimensional parameters of the rectangular slot are dependent on the material being processed, the product being made and the mold construction. While the rectangular slot expansion of the material flow channel has been described as being particularly useful in blowing quadrilateral, for example, rectangular containers, the invention is applicable to any container shape which requires the elliptical parison be stretched over different distances, thereby varying the wall thickness of the final blow molded product. For example, the invention is applicable to the process of blow molding generally cylindrical containers as well as multilateral containers. In the description of FIG. 1, the mandrel is illustrated as having multiple lands or frustums at its end. The rectangular cutout section of the present invention is applicable to die rings and mandrels of any configuration whether they be frustoconical, tapered or cylindrical or with single or multiple lands. However, the length of the rectangular cut out section and land is described as being measured along a line parallel to the longitudinal axis of the die. The length of the rectangular cut out section and land can also be measured across the respective surfaces of the rectangular cut out section and land along a line perpendicular to the die exit. Whether the length is measured across the surfaces or along a line parallel to the longitudinal axis, the length measurement of the rectangular cutout section as a percentage of the length of the land is the same. The invention, in its broadest aspects, is therefore not limited to the specific details shown and described. Accordingly, departures may be made from such details without parting from the spirit or scope of the general inventive concept.

What is claimed is:

1. A die for extruding a thermoplastic material into a tubular parison used to blow mold a container, the tubular parison having different wall thicknesses at different points around a perimeter of an annular cross-section of the tubular parison, the die comprising:

a die ring having
   an internal surface defining one side of a material flow channel, and
   one end defining a circumferential die exit;

a mandrel located within and movable with respect to said die ring and having an external surface defining an opposite side of said material flow channel, and said material flow channel having a flow channel depth determined by a distance separating said internal and external surfaces of said die ring and mandrel, respectively; and at least one fixed cutout in one of said internal and external surfaces of said die ring and mandrel, respectively, said fixed cutout being adjacent said die exit for increasing said flow channel depth over a flow channel section contiguous with said fixed cutout, said fixed cutout having
   an arcuate lower edge contiguous with said die exit and having a midpoint providing a maximum flow channel depth, said lower edge extending symmetrically in opposite directions from the midpoint along a curved path terminating at two ends on said one of said internal and external surfaces,
   an arcuate upper edge located on said one of said internal and external surfaces upstream from the die exit, said upper edge being generally parallel to said lower edge and defining an intersection of said fixed cutout with said one of said internal and external surfaces, and
   two side edges located on said one of said internal and external surfaces, said side edges extending between ends of said upper and lower edges in directions substantially perpendicular to both of said upper and lower edges.

2. The die of claim 1 wherein said one of said internal and external surfaces of said die ring and mandrel, respectively, is said internal surface and includes:

a land surface having one edge contiguous with said die exit and an opposite edge, said land surface having a length measured between said one and said opposite edges along a line substantially parallel to a longitudinal centerline of said die, and said fixed cutout further having
   an approximately constant length measured between said upper and said lower edges along said line substantially parallel to said longitudinal centerline, said length of said fixed cutout being less than said length of said land surface.

3. The die of claim 2 wherein said length of said fixed cutout is in a range of approximately from 10% to 35% of said length of said land surface.

4. The die of claim 3 wherein said fixed cutout has a depth increasing said flow channel depth at the midpoint of said lower edge in a range of from approximately 0.001 inches (0.025 mm) to approximately 0.010 inches (0.25 mm).

5. The die of claim 2 wherein said length of said fixed cutout is in a range of from approximately 15% to approximately 25% of said length of said land surface.

6. The die of claim 5 wherein said fixed cutout has a depth increasing said flow channel depth at the midpoint of said lower edge in a range of from approximately 0.003 inches (0.076 mm) to 0.005 inches (0.127 mm).

7. The die of claim 2 wherein said length of said fixed cutout is approximately 20% of said length of said land surface.

8. The die of claim 7 wherein said fixed cutout has a depth increasing said flow channel depth at the midpoint of said lower edge by approximately 0.004 inches (0.100 mm).

9. A method of extruding a material through a die into a tubular parison having a varying wall thickness around a perimeter of an annular cross-section of the parison, the method comprising the steps of:

feeding the material through a generally circular circumferential section of an annular material flow path having a flow channel depth formed between an internal surface of a die ring and an external surface of a mandrel located within said die ring; and feeding the material through a circumferential fixed quadrilateral cutout section of the annular material flow path formed in one of the internal surface and the external surface of the die ring and mandrel, respectively, and having an arcuate lower edge contiguous with a die exit and having a midpoint providing a maximum flow channel depth, said lower edge extending symmetrically in opposite directions from the midpoint along a curved path terminating at two ends on said one of said internal and external surfaces, an arcuate upper edge located on said one of said internal and external surfaces upstream from the die exit, said upper edge being generally parallel to said lower edge and defining an intersection of said fixed cutout section with said one of said internal and external surfaces, and two side edges located on said one of said internal and external surfaces, said side edges extending between ends of said upper and lower edges in directions substantially perpendicular to both of said upper and lower edges, whereby material feeding through the circumferential fixed quadrilateral cutout section has a greater mass flow than material feeding through the generally circular circumferential section, and the material feeding through the circumferential fixed quadrilateral cutout section has a linear velocity approximately equal to a linear velocity of the material feeding through the generally circular circumferential section.

\* \* \* \* \*